United States Patent [19]

Rubinshtein et al.

[11] 4,194,277

[45] Mar. 25, 1980

[54] METHOD AND DEVICE FOR STAMPING BALL RETAINERS

[76] Inventors: Efim Rubinshtein; Abram Rubinshtein, both of 621 Avenue Z, Brooklyn, N.Y. 11223

[21] Appl. No.: 959,414

[22] Filed: Nov. 13, 1978

[51] Int. Cl.² ............................................. B21D 53/12
[52] U.S. Cl. ................................. 29/148.4 C; 72/414; 72/350; 29/148.4 R
[58] Field of Search .................. 29/148.4 R, 148.4 C, 29/149.5 DP, 149.5 S, 566; 72/334, 338, 401, 414, 418, 379, 350

[56] References Cited

U.S. PATENT DOCUMENTS

| | | | |
|---|---|---|---|
| 1,596,881 | 8/1926 | Lacke | 72/414 |
| 2,980,046 | 4/1961 | McGregor et al. | 72/350 |
| 3,365,775 | 1/1968 | Cavagnero et al. | 29/148.4 C |
| 3,526,026 | 9/1970 | Warchol | 29/148.4 C |
| 3,638,474 | 2/1972 | Hannaford | 72/414 |

*Primary Examiner*—Milton S. Mehr
*Attorney, Agent, or Firm*—Lackenbach, Lilling & Siegel

[57] ABSTRACT

This invention provides for stamping of the platforms of a ball retainer on one side of the surface of the metal band and of the spherical seats on the other side of the surface of the band in a single continuous operation or in several operations. Two mating punches are used in order to stamp out the desired ball retainer. A first punch has rectangular upwardly projecting lugs and spherical recesses and the second punch has spherical outwardly extending lugs and rectangular recesses. As these two punches are moved toward each other, they cause the platforms and the spherical seats of the ball retainer to be stamped in the metal band. The lugs on each of the punches and the side surfaces of hollow recesses of the dies are provided with cutting edges, which cut out the ball retainer from the metal band.

13 Claims, 8 Drawing Figures

METHOD AND DEVICE FOR STAMPING BALL RETAINERS

BACKGROUND OF THE INVENTION

Presently, ball retainers are stamped on low-speed multi-positional presses. As many as five or six, or even more, operations are needed to stamp a properly functioning ball retainer. In such presses, first a ring is cut out of the metal band. Then, in separate operations, the ring is stamped into a ball retainer. Naturally, each operation has a margin of error. Thus, after several operations a considerable margin of error is built up. Therefore, it proves to be extremely difficult to manufacture a ball retainer within high tolerances.

Additionally, the shape of the spherical seats for the ball does not always conform to the contour of the ball. This causes the ball to move within its seat and to generate rattling noises. In addition to the noise being unacceptable, the rattling decreases the service life of the ball retainer. The repeated rattling causes the ball retainer and the bearing to wear out much too quickly.

SUMMARY OF THE INVENTION

The herein-proposed invention is designed to overcome all the disadvantages of the prior art devices.

It is an object of this invention to provide a machine for stamping ball retainers which is simple in operation and works within high tolerances.

A further object is to ensure that the shape of the spherical seats conforms to the shape of the balls themselves, so as to prevent rattling. Therefore, inasmuch as the rattling is prevented, the service life of the ball retainer and the bearing is greatly increased. Moreover, by using the present invention, which cuts down the number of operational steps, the ball retainer can be more efficiently produced and fewer man hours will be required in its manufacture. Moreover, applicants can manufacture their ball retainer in a cheap and high-speed one-positional press. This invention also leaves less waste than the prior art machines, which cuts down the consumption of expensive metals.

The invention accomplishes these goals by forming the platforms on one side of the metal band and forming the spherical seats on the other side. By pushing a portion of the metal of the band into a hollow recess of a respective one of the dies, the desired platforms and spherical seats can be formed.

A second punch with spherical lugs is used to press out the metal of the band and to form spherical seats in the band. This punch is activated by the plunger of the press and works in a conventional manner. Lugs of a first punch push out a portion of the band and define platforms in the band. After the platforms are formed in the band, the spherical seats are formed in the band by the lugs of the second punch and then the to be manufactured ball retainer is calibrated. Cutting edges are included on the side surfaces of the lugs of the punches and on the walls of the hollow recesses of the dies and continued motion of the dies and the punches causes the cutting edges to cut out the ball retainer from the band.

As can be seen in a comparison of the spherical seats of the ball retainer of the prior art and of the ball retainer of the invention, there is a subtle, but important distinction. The prior art ball retainers have spherical seats which do not conform exactly to the shape of the balls. The spherical seats of the ball retainer of the instant invention do conform exactly to the shape of the balls. Thus, the balls used with this invention do not rattle in their seats. Therefore, there is less wear on the bearings and on the ball retainers and, therefore, their service life is greatly increased. The reason for this is that the width "b" of the spherical surfaces of the spherical seats of the ball retainer of the prior art is less than the width "a" of the corresponding spherical surfaces of the spherical seats of the ball retainer disclosed by this invention. (See FIG. 8 and the illustration of the prior art.)

DETAILED DESCRIPTION OF THE INVENTION

Figures 5, 8:
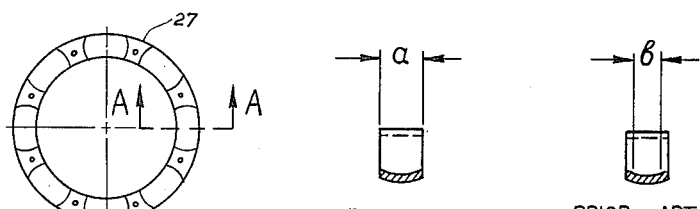
FIG. 5 is a top, plan view of a completed ball retainer.
FIG. 8 is a cross-sectional view of the ball retainer taken along the line A—A of FIG. 3.
Figure 7:
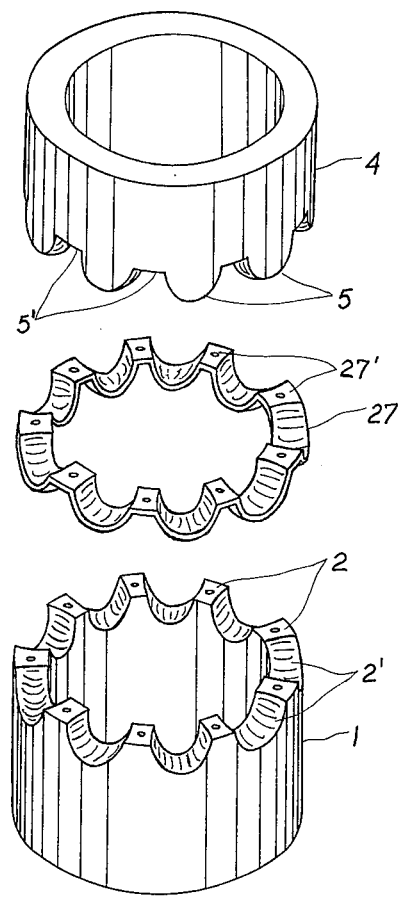
FIG. 7 is an exploded, perspective view of the ball retainer and the punches.

Any conventional stamping press known in the art can be adapted to embody the components of the instant invention to stamp ball retainers. As in all stamp presses, the press used by the invention includes a frame to hold all of the components together, a plunger to transmit motion to the various components, and work surfaces on which the element to be worked, in this case the metal band which is to be made into a ball retainer, is placed. A completed ball retainer has a plurality of platforms and spherical seats (FIGS. 5 and 7). Therefore, it must be appreciated that the instant invention is essentially circular in shape. In order to explain the operation and construction of the invention in a simple manner, only one portion of the invention is shown.

Figure 1:
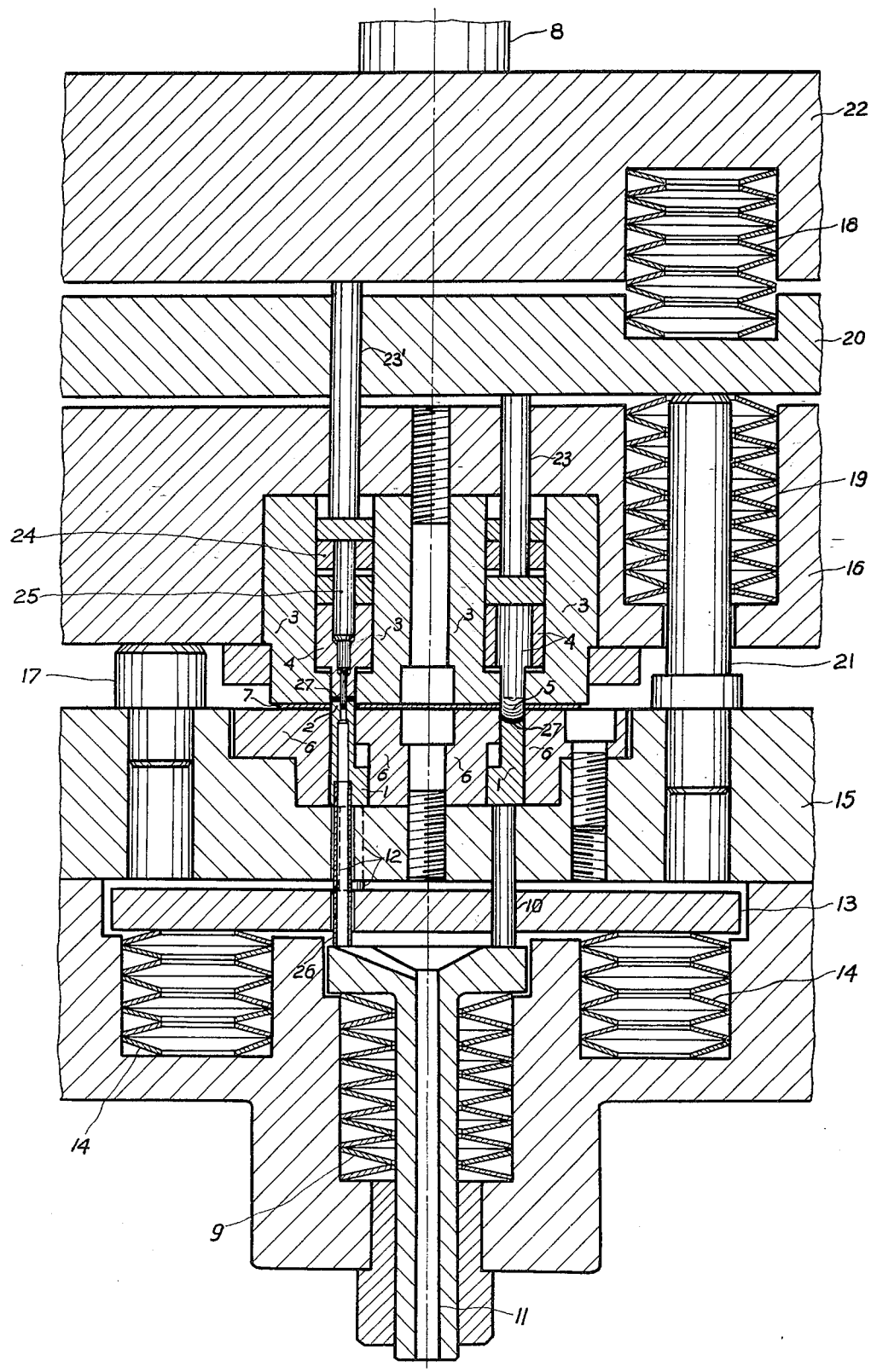
FIG. 1 is an elevational, cross-sectional view of the portion of the press containing the device for stamping ball retainers.

Referring now to FIG. 1, secured in a bottom or support plate 15 of the device is a die 6 with a circular recess. The top surface of the die 6 is the work surface with relation to which the metal band 7 is positioned. A circular punch 1 is movably secured in the recess of the die 6. As can be seen from FIG. 7, the punch 1 has raised rectangular in shape lugs 2 and spherical recesses 2'. The contour of the top portion of the punch 1, namely the lugs 2 and the recesses 2', is shaped so as to correspond to the desired shape of the completed ball retainer 27.

A work plate 16 includes a die 3. Movably secured in a circular recess of the die 3 is a circular punch 4. The punch 4 should be so arranged in the die 3 that it (the punch 4) is in working alignment with the punch 1 positioned in the die 6. As is illustrated in FIG. 7, the punch 4 includes spherical lugs 5. The inner and outer side surfaces of these lugs 5 and the inner and outer surfaces of the lugs 2 of the punch 1 are made sharp, so that they may be capable of cutting out the desired ball retainer. Essentially rectangular in shape recesses 5' are also included in the punch 4. It must be appreciated that the punches 1 and 4 are constructed so that they will fit perfectly together when the completed ball retainer 27 is fitted between them during the calibration operation.

Figure 2:
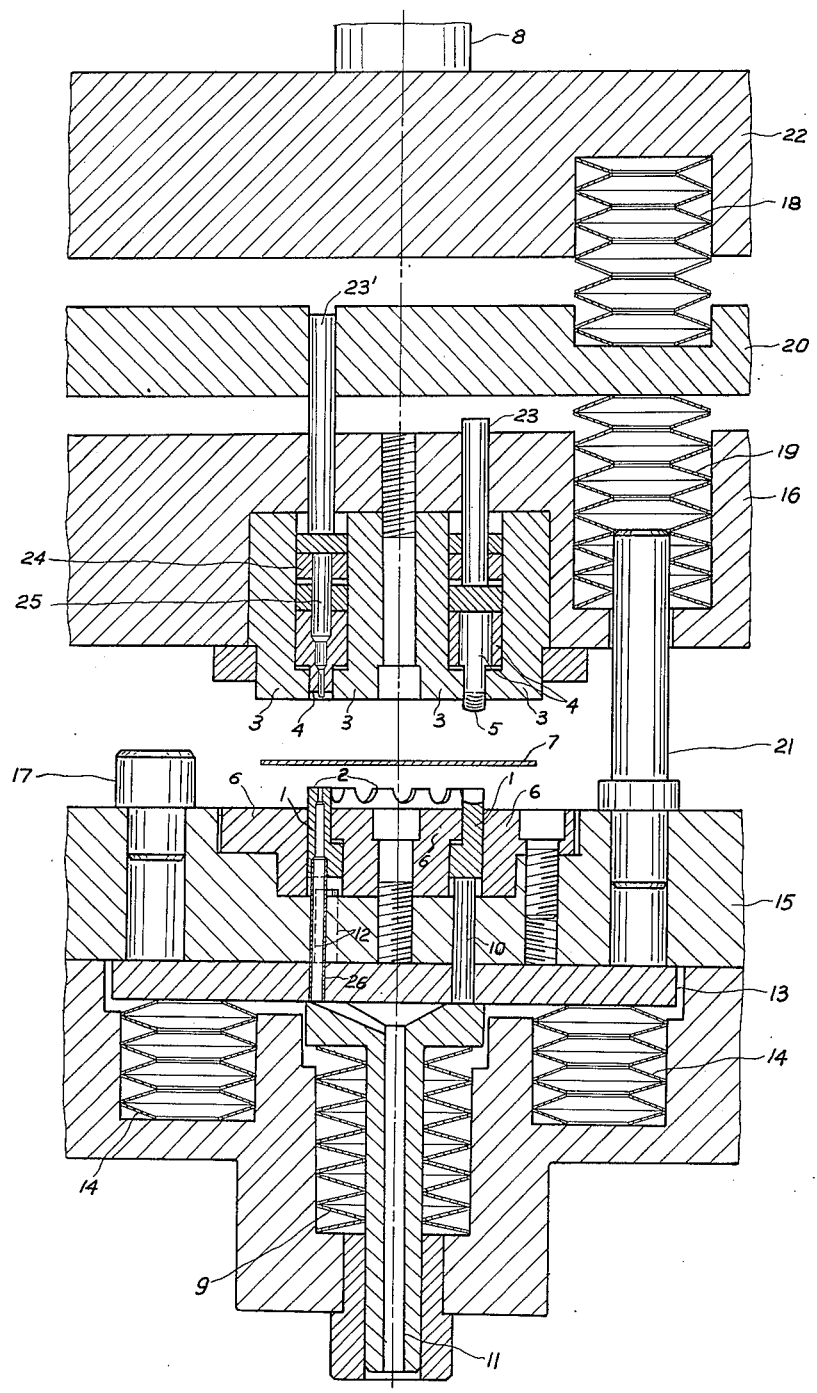
FIG. 2 is an elevational, cross-sectional view of the portion of the press containing the device for stamping ball retainers with the components in their initial portions.

In the initial positions (FIG. 2), the plunger 8 of the press is in its upper position and the metal band 7 is supported by side lifters (not shown) above the lugs of punch 1, which are extending above the top or working surface of the die, this being the extreme top position of the punch. When the press is activated, the plunger 8 moves downward and this causes the die 3 to press the band 7 towards the die 6. This causes the punch 1 to be forced downward and, by means of the transmission bars 10 and the pusher 11, the spring 9 is compressed. When the punch 1 has moved down so far that its bottom end face touches against the bars 12 of the plate 13, further downward motion of the punch 1 is curtailed. This is accomplished by the utilization of springs 14 which have a compression factor such that they will not be compressed by the downward force of the punch 1, i.e. the compression factor of the spring 14 is greater than the cutting force.

Figure 3:
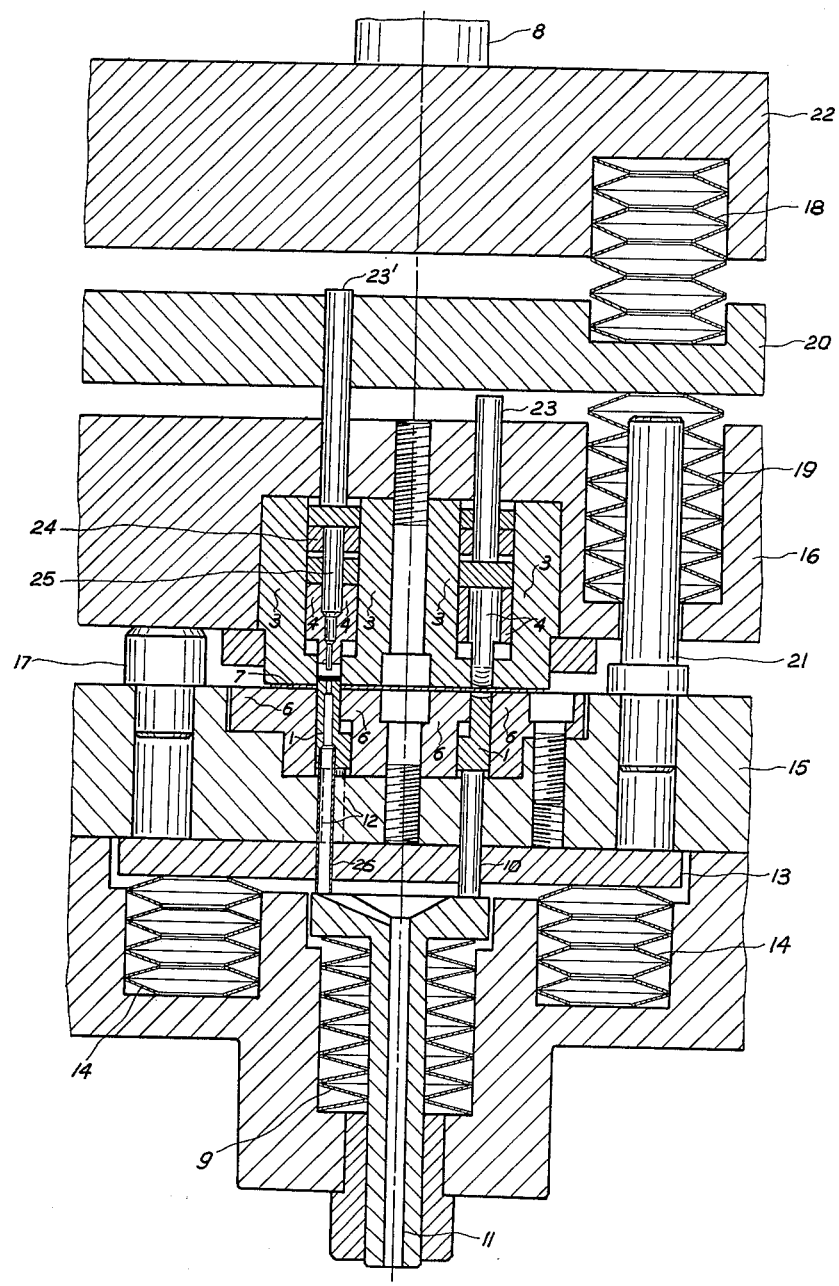
FIG. 3 is an elevational cross-sectional view of the portion of the press containing the device for stamping ball retainers with the components in the position for stamping the platforms.

At this point, as the punch 1 cannot move downward any further, the continued downward motion of the plunger 8 causes the rectangular lugs 2 of the punch 1 to penetrate into the hollow recess of the die 3. (See FIG. 3) As the metal band 7 is positioned between the lugs 2 of the punch 1 and the hollow recess of the die 3, this movement of the lugs into the hollow recess of the die 3 will cause platforms to be stamped in the band 7. When the plate 16 has been moved so far that it rests against the stop 17, the plate 16 and the die 3 will no longer move downward.

Further motion of the plunger 8 causes the springs 19 to be compressed and causes the plate 20 to press on the bars 23. This motion causes the lugs 5 of the punch 4 to penetrate into the hollow recess of the die 6. Again, as the metal band is disposed between the punch 4 and the hollow recess of the die 6, spherical seats will be stamped in the band 7.

The next step is the calibration operation. Now, the punches 1 and 4 and the metal band 7 are compressed tightly together. They now move as a single unit downward and cause the spring 14 to be compressed by means of the bars 12 and the plate 13. Further motion causes the sharpened edges of the lugs 5 of the punch 4 and the sharp edges of the side surfaces of the die 6 to cut out a ball retainer 27 from the metal band 7. A stop member 21 is used to prevent further downward motion of the plate 20. Finally, the springs 18 are caused to compress and the top plate 22 causes the bars 23' to move downward. This causes a ring 24 in the die 3 to push piercing punches 25 downward. These piercing punches 25 cause rivet holes to be stamped in the rectangular platforms 27' of the ball retainer 27. The punch 1 has passages through which the stamped out material can pass, so that it may enter pipes 26 and travel through a central hole in the pusher 11 until it reaches a waste bin.

After the operation is completed, the plunger 8 is raised and the springs 14 and 9 by means of the pusher 11, the transmission bars 10, the plate 13 and bars 12, push the completed ball retainer out from inside the die 6. The side lifters assist in lifting up the completed ball retainer 27 and also in removing the completed ball retainer from the hollow recess of the die 3. In the next operational position (not shown), the ball retainer and the central waste are pushed out of the band.

It must be appreciated that the springs 9, 14, 18 and 19 are designed so that they will be compressed in a sequence that will allow the operation to commence as described above. Thus, the design of the machine must pick appropriate compression factors for each of these springs. The spring 18 should have the strongest compression factor, the spring 19 the next strongest, the spring 14 the next strongest and the spring 9 the weakest compression factor. It should be appreciated that various substitutes for these springs can be used, so long as they provide the same effects.

Figure 4:
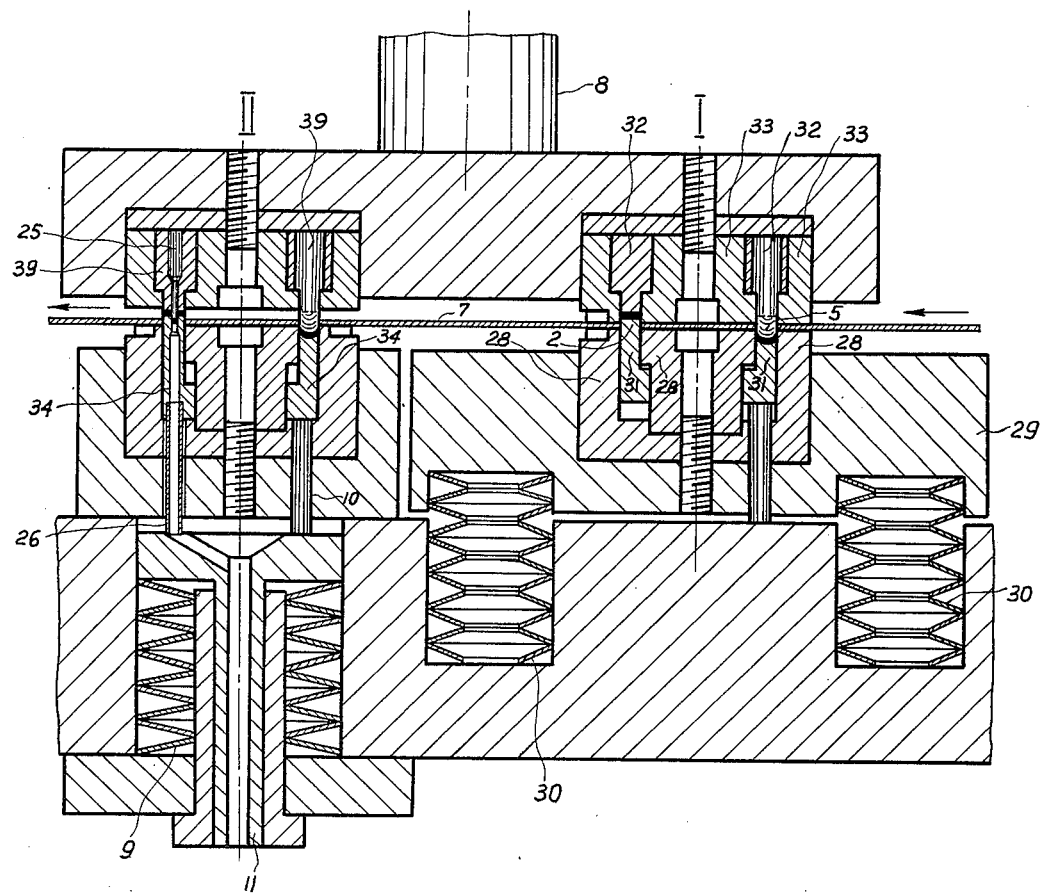
FIG. 4 is an elevational, cross-sectional view of the portion of the press containing an alternate embodiment of the device for stamping ball retainers.

FIG. 4 illustrates an alternate embodiment of the invention. Initially, the metal band is supported above the die 28 by the side lifters (not shown). When the plunger 8 of the press moves down, spherical lugs 5 of the punch 32 penetrate into a hollow recess of the die 28. As the plate 29 and the die 28 are maintained securely in their top positions by the spring 30, this operation causes the spherical lugs 5 to stamp a spherical seat in the metal band. The compression factor of the spring 30 is greater than the cutting force. In this case, the punch 32 is secured in a recess of a die 33. Thereafter, the die 28 is caused to move down together with the plate 29 and the springs 30 are compressed. This continued motion causes the lugs 2 of the punch 31 to penetrate into the hollow recess of the die 33, thus causing rectangular platforms to be stamped in the metal band. At this point of the operation, calibration of the ball retainer is accomplished. Instead of now being cut, as was done in the first embodiment, the metal band is lifted from this position and moved to the next operational position (the left most position of FIG. 4). At this second position, when the plunger 8 is moved downward, the piercing punches 25 stamp the rivet holes in the platforms of the metal band. Now punch 39 is used to cut out a ball retainer from the metal band. The punch 34 has central passages which communicate with pipes 26 for the purpose of removing waste material from the work area. As is obvious from the description of the embodiment, Roman numeral one (I) indicates the first working position of the device and Roman numeral two (II) indicates the second position of the device.

Figure 6:
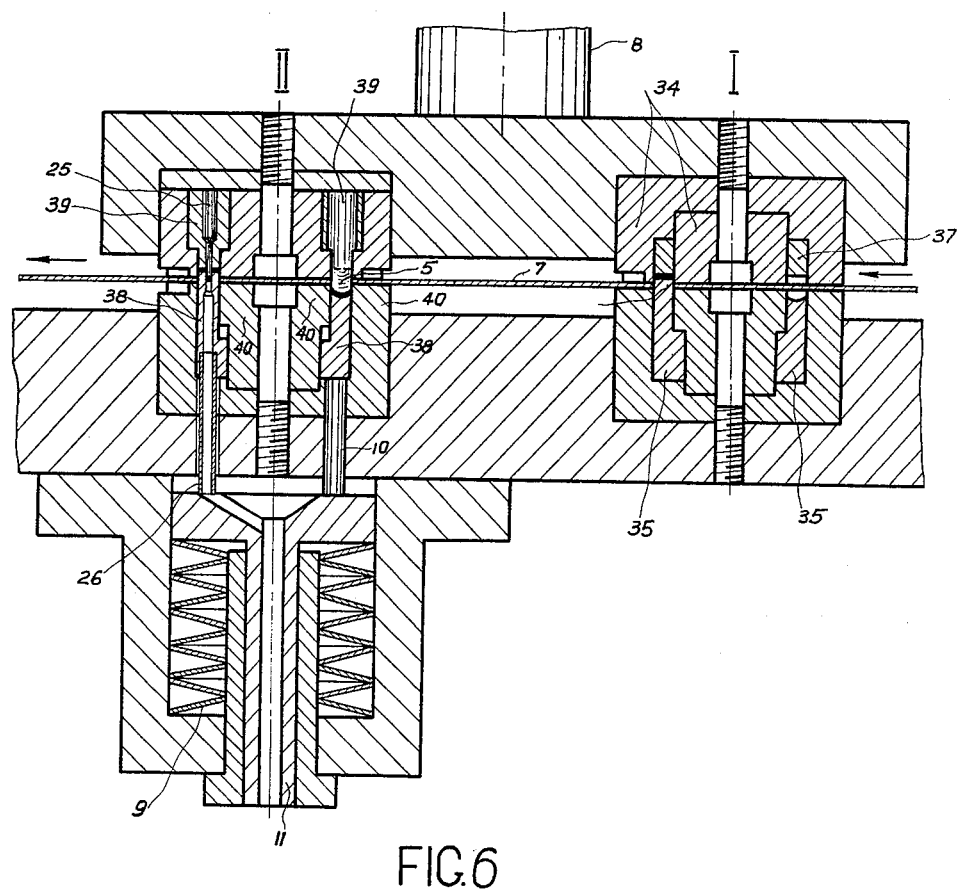
FIG. 6 is an elevational, cross-sectional view of the portion of the press containing a third embodiment of the device for stamping ball retainers.

FIG. 6 illustrates another possible embodiment of a two-positional device. Roman numeral one (I) and Roman numeral two (II) indicate the first and second positions, respectively, of the device. In this device when the plunger 8 moves down, the lugs of the punch 35 penetrate into the hollow recess of the die 36. This causes the platforms stamped in the metal band to be tightly closed between the punch 35 and the ring 37, thus providing for calibration of the desired platforms only. When the plunger 8 of the press is raised, the side lifters lift the band above the lugs 2 of the punch 35. At the second position of this device, when the plunger 8 moves downward, the spherical lugs 5 of the punch 39 stamp a spherical seat in the band. Simultaneously, the sharpened edges of the lugs 5 of the punch 39 cause a ball retainer to be cut out from the metal band. A recess of a die 40 is included into which the lugs 5 are disposed when they stamp out the spherical seats. After this step, the rivet holes are made in the platforms by the piercing punches 41. At this point of the operation, the spherical seats are calibrated. Again, when the operation is completed, the components are moved to their initial positions and the completed ball retainer is removed from the device. At the next position (not shown) the ball retainer is pushed out of the band.

It should be appreciated that if it is desired that a ball retainer be manufactured without rivet holes, for example, when the ball retainer is to be welded to some surface, the piercing punches can be removed from the device and a ball retainer can be manufactured without rivet holes. Also, because of the unique design of this apparatus, more than one stamping device can be inserted in a single press. Thus, by such means, it is possible to stamp simultaneously ball retainers of different sizes in the same metal band. In this way, a more efficient use of the metal band can be achieved.

Further, it is possible to manufacture the ball retainer in several operations in a multi-positional device. For example, in the first position the platforms can be formed, in the second position the spherical seats can be formed, in the third position the retainer can be calibrated, in the fourth position rivet holes can be punched in the platforms, and in the fifth position the ball retainer can be cut out from the band.

The herein described devices can be used for realization of the disclosed method of stamping ball retainers. This method of stamping retainers decreased the tension of the retainer. Because the platforms and the spherical seats are formed on opposite sides of the surface of the band, it is guaranteed that the zones of deformation of the platforms and of the spherical seats are separated.

We claim:

1. A method of stamping ball retainers from a metal band, comprising the steps of: pressing the metal band against a first punch to form rectangular platforms in the band, said first punch having rectangular lugs and spherical recesses; pressing a second punch against an opposite side surface of said band to the surface pressed against said first punch to form spherical seats on said band, said second punch having spherical lugs and rectangular recesses; calibrating said band by compressing said punches and said band together; and cutting out a ball retainer from the band.

2. A method of stamping ball retainers according to claim 1, wherein said punches push said band toward and into a respective hollow recess in a respective die aligned with the respective punch.

3. A method of stamping ball retainers according to claim 1, further comprising the step of stamping holes in said platforms.

4. A method of stamping ball retainers according to claim 3, wherein forming the platforms, forming the spherical seats and calibrating the platforms and the spherical seats occurs at a first position; and wherein stamping the holes and cutting out the ball retainers from the band occur at a second position.

5. A method of stamping ball retainers according to claim 1, wherein forming the platforms, forming the spherical seats and calibrating the platforms and the spherical seats occurs at a first position; and wherein cutting out the ball retainers from the band occurs at a second position.

6. A method of stamping ball retainers from a metal band, comprising the steps of: pressing the metal band against a first punch to form rectangular platforms in the band, said first punch having rectangular lugs and spherical recesses; calibrating said platforms by compressing said first punch and said band together, said steps of forming the platforms and calibrating the platforms occurring at a first position; pressing a second punch against an opposite side surface of said band to the surface pressed against said first punch to form spherical seats on said band, said second punch having spherical lugs and rectangular recesses; calibrating said spherical seats by compressing said second punch and said band together; stamping holes in said platforms; and cutting out a ball retainer from the band, said steps of forming the spherical seats, stamping the holes, calibrating the spherical seats and cutting out the ball retainers from the band occurring at a second position.

7. A method of stamping ball retainers from a metal band, comprising the steps of: pressing the metal band against a first punch to form rectangular platforms in the band, said first punch having rectangular lugs and spherical recesses; calibrating said platforms by compressing said first punch and said band together, said steps of forming the platforms and calibrating the platforms occurring at a first position; pressing a second punch against an opposite side surface of said band to the surface pressed against said first punch to form spherical seats on said band, said second punch having spherical lugs and rectangular recesses; calibrating said spherical seats by compressing said second punch and said band together; and cutting out a ball retainer from the band, said steps of forming the spherical seats, calibrating the spherical seats and cutting out the ball retainers from the band occurring at a second position.

8. A device for stamping ball retainers from a metal band, comprising a press having a main plunger; a first die with a circular hollow recess positioned in a bottom plate of the device; a first punch movably positioned in said recess of said first die and having raised rectangular in shape lugs and spherical recesses, inner and outer side surfaces of said lugs being made sharp, said first punch being kinematically connected to said main plunger; a first spring means positioned in said device; means for kinematically connecting said first punch and said first spring means; a means for limiting motion of the first punch; a second die with a circular hollow recess positioned in a work plate of the device; a second punch movably positioned in said recess of said second die and having raised spherical lugs and rectangular in shape recesses, inner and outer surfaces of said lugs being made sharp, said second punch being kinematically connected to said main plunger and being in working alignment with said first punch; and second spring means positioned in said device for controlling the sequence of operation of said first and second punches and kinematically connected to said punches and said plunger.

9. A device for stamping ball retainers according to claim 8, wherein said first spring means has the lowest compression factor, so that said platforms are stamped and then spherical seats are stamped.

10. A device for stamping ball retainers according to claim 8, further comprising means for limiting the motion of said second die; and means for limiting the compression of said second spring means.

11. A device for stamping ball retainers according to claim 8, further comprising piercing punches positioned in said second die for stamping holes in platforms of said ball retainer and kinematically connected to said plunger.

12. A device for stamping ball retainers according to claim 8, further comprising a third spring means kinematically connected to said piercing punches and said plunger.

13. A device for stamping ball retainers according to claim 12, wherein said first spring means has the weakest compression factor and said third spring means has the strongest compression factor, so that first said platforms are stamped, then spherical seats are stamped and then holes are punched in said platforms.

* * * * *